UNITED STATES PATENT OFFICE.

JOHN K. HAYWOOD, OF WASHINGTON, DISTRICT OF COLUMBIA.

PROCESS FOR MANUFACTURING CALCIUM ARSENATE FOR INSECTICIDAL USE.

1,266,258.     Specification of Letters Patent.     Patented May 14, 1918.

No Drawing.     Application filed March 30, 1918. Serial No. 225,780.

(DEDICATED TO THE PUBLIC.)

*To all whom it may concern:*

Be it known that I, JOHN K. HAYWOOD, a citizen of the United States of America, residing at Washington, in the District of Columbia, (whose post-office address is Bureau of Chemistry, United States Department of Agriculture, Washington, D. C.,) have invented three new and useful Processes for Manufacturing Calcium Arsenate for Insecticidal Use.

This application is made under the act of March 3, 1883, chapter 143 (22 Stat., 625), and the invention herein described and claimed, may be used by the Government of the United States, or any of its officers or employees, in the prosecution of work for the Government, or any person in the United States, without payment to me of any royalty thereon.

The object of my invention is to provide processes for manufacturing calcium arsenate, for the purpose of producing calcium arsenate for insecticidal uses. The basic features of my invention are, first, the employment of water slaked lime, air slaked lime or lime and arsenic acid (commercial or pure) either with or without the application of heat and either in the presence of excess water or not in the presence of excess water, to produce tricalcium ortho arsenate for insecticidal purposes; second, the employment of lime stone ($CaCO_3$), preferably finely powdered, and arsenic acid (commercial or pure), either with or without the application of heat, and either in the presence of excess water or not in the presence of excess water, to produce dicalcium ortho arsenate for insecticidal purposes; third, the employment of lime stone ($CaCO_3$), preferably finely powdered, and arsenic acid (commercial or pure), either with or without the application of heat and either in the presence of excess water or not in the presence of excess water, to produce dicalcium ortho arsenate and treatment of the dicalcium ortho arsenate thus formed with a sufficient quantity of water slaked lime, air slaked lime or lime to produce tricalcium ortho arsenate.

The tricalcium ortho arsenate formed by the first process mentioned can be used directly as an insecticide, can be used as an insecticide in the form of a paste after part of the water has been pressed out, or can be used as an insecticide in the form of a powder after most of the water has been driven off by heat or by other means. It is poisonous to external leaf eating insects and to certain other insects, is quite insoluble in water or water containing dissolved lime, is very finely divided and its suspension properties in water are excellent. It is, therefore, a first-class material for insecticidal use and especially for use in dusting machines or mixed with water to form a spray.

The dicalcium ortho arsenate formed by the second process, after treatment with an excess of lime by the consumer, can be used as an insecticide in the form of a paste after part of the water has been pressed out and treatment with an excess of lime by the consumer, or can be used as an insecticide in the form of a powder, after most of the water has been driven off by heat or by other means, and treatment with an excess of lime by the consumer. It is poisonous to external leaf eating insects and to certain other insects, is quite insoluble in water containing dissolved lime, is finely divided and its suspension properties are fair. It is, therefore, of value as an insecticide and especially so when mixed with water and an excess of lime and used in the form of a spray.

The tricalcium ortho arsenate formed by the third process mentioned can be used directly as an insecticide, can be used as an insecticide in the form of a paste after part of the water has been pressed out, or can be used as an insecticide in the form of a powder, after most of the water has been driven off by heat or by other means. It is poisonous to external leaf eating insects and to certain other insects, is quite insoluble in water or water containing dissolved lime, is finely divided and its suspension properties in water are good. It is, therefore, of value as an insecticide, being especially valuable for use in dusting machines or mixed with water to form a spray.

It is well established by countless spraying experiments, that an insecticide which is intended to be used on vegetation, should possess the property of killing the insects, should be insoluble in water to any marked extent, or be capable of being rendered insoluble by some simple and inexpensive treatment, so that it will not be toxic to the foliage, should be of fine texture so that it will stick to the leaves, and should possess the property of remaining suspended in water a considerable length of time so that an even spray will be obtained when the product is suspended in water and sprayed on vegetation. The insecticide should also be cheap, if this is possible. The above mentioned properties are claimed for the calcium arsenates prepared by the three above mentioned processes.

Having thus described my invention, I claim:

1. A process of manufacturing dicalcium ortho arsenate, suitable for certain insecticidal purposes when used alone and suitable for use as an insecticide on foilage when mixed with lime, by the action of lime stone (preferably finely powdered) on arsenic acid.

2. A process of manufacturing tricalcium ortho arsenate suitable for insecticidal purposes, by the action of lime stone (preferably finely powdered) on arsenic acid and subsequent treatment of the dicalcium ortho arsenate thus formed with a sufficient quantity of lime, to produce tricalcium ortho arsenate.

3. A process of manufacturing tricalcium ortho arsenate suitable for insecticidal purposes, by the action of lime stone (preferably finely powdered) on arsenic acid and subsequent treatment of the dicalcium ortho-arsenate thus formed with a sufficient quantity of slaked lime, to produce tricalcium ortho arsenate.

In testimony, I affix my signature in the presence of two subscribing witnesses.

JOHN K. HAYWOOD.

Witnesses:
G. L. HOFFMAN,
A. J. DECKER.